Patented June 25, 1935

2,006,227

UNITED STATES PATENT OFFICE 2,006,227

CONTACT INSECTICIDE

Euclid W. Bousquet, Wilmington, Del., assignor, by mesne assignments, to The Grasselli Chemical Company, Cleveland, Ohio, a corporation of Delaware No Drawing. Application October 19, 1932
Serial No. 638,600

8 Claims. (Cl. 167—22)

This invention relates to contact insecticides containing a phosphatide as the essential active ingredient.

Phosphatides are a group of natural lipoid substances which occur in animal and vegetable cellular structures; they are considered to contain phosphoric acid esters of glycerine combined with fatty acids and complex amines such as choline. Cephaline and the lecithins are typical phosphatides. In chemical constitutions and properties the phosphatides of animal and vegetable origin are quite similar.

Insecticides are usually classed in two main groups: stomach poisons which are sprayed upon foliage or placed in material used by the insect as food and contact insecticides which are brought into external contact with the insect. Contact insecticides provide the only means of controlling the large class of insect pests which feed by sucking plant juices.

Cheap inorganic compounds such as arsenicals, fluorine compounds, etc. are readily available and suitable as stomach poisons. Generally, these are used with emulsifying and spreading agents which, however, do not contribute to the inherent toxicity of the stomach poison.

The only commercially practicable contact insecticides, on the other hand, are expensive plant extracts such as nicotine, rotenone and pyrethrum.

The chemical analogy of the natural phosphatides as obtained from various animal or vegetable origin is reflected in their action upon insects and I have found that generally such phosphatides, such as for instance lecithin obtained from seeds as well as lecithin from egg yolks and other animal cellular tissues, such as are commonly used in the pharmaceutical arts, have generally properties which make these phosphatides eminently suited as contact insecticides.

While the phosphatides in general have been found to have aphicidal action, the crude phosphatides extracted from soya beans have been found to be particularly valuable for this purpose and considerably more toxic than phosphatides extracted from animal tissue.

For use as insecticides I preferably incorporate small amounts of, for instance, 0.1 to 0.2% of the phosphatide in water in the form of a suspension or emulsion and spray this as is common in the application of contact insecticides or I comminute the preparation with or without an inert filler and use the insecticide as a dust.

Soya beans are an excellent raw material for obtaining in an economic manner a phosphatide useful as a contact insecticide.

Extraction of soya beans with alcohol and benzine produces a technical lecithin which usually contains 60% lecithin, the remainder being largely soya bean oil, water and small quantities of impurities. This crude mixture is found to disperse in water rather slowly and unsatisfactorily and, while a number of agents may be incorporated with this crude mixture containing soya bean lecithin to promote satisfactory dispersions, it has been found that only certain organic agents result in an emulsion with maximum toxicity to sucking insects and satisfactory stability. The addition of organic solvents which act as dispersing agents, such as butyl alcohol, to the technical soya bean lecithin gives a product which emulsifies very readily in water and possesses high toxicity as a contact insecticide. The solvent may be used with the soya bean lecithin in various proportions, and a preferred composition consists of two parts of the lecithin to one part of the organic solvent.

Alkalis, such as ammonium hydroxide or sodium hydroxide, give good emulsions with lecithins; these solutions, however, possess lower toxicity than the preferred emulsions prepared with an organic solvent and they deteriorate on standing.

Other organic solvents or dispersing agents which have been found useful in preparing contact insecticides containing a lecithin as the essential active ingredient, are for instance organic amines, such as the ethanol amines, glucamine, etc., organic solvents such as mono and polyhydric alcohols, esters, ethers, aldehydes and ketones, soaps, such as sodium oleate, sulfonated oils, such as sulfonated fish oil, etc., these are added in any proportion suitable to the formation of toxic emulsions.

The following table summarizes the insecticidal effect obtained by the application of my novel contact insecticides.

| Composition | Percentage concentration of insecticide—water solution | Average percentage kill | Type of insect |
|---|---|---|---|
| A | 0.25 | 92.6 | Black Chyrsantheum Aphis. |
| B | 0.2 | 93.7 | Black Chyrsantheum Aphis. |
| C | 0.2 | 96.8 | Black Chyrsantheum Aphis. |
| C | 0.2 | 93.4 | Green Chyrsantheum Aphis. |
| D | 0.2 | 96.6 | Black Chyrsantheum Aphis. |
| D | 0.2 | 91.7 | Green Chyrsantheum Aphis. |
| E | 0.2 | 90.0 | Green Chyrsantheum Aphis. |
| F | 0.2 | 93.7 | Green Chyrsantheum Aphis. |
| F | 0.2 | 97.7 | Black Chyrsantheum Aphis. |
| G | 0.25 | 95.3 | Black Chyrsantheum Aphis. |
| H | 0.2 | 95.0 | Green Chyrsantheum Aphis. |
| H | 0.1 | 91.0 | Green Chyrsantheum Aphis. |
| H | 0.2 | 100.0 | Black Chyrsantheum Aphis. |
| H | 0.1 | 100.0 | Black Chyrsantheum Aphis. |
| I | 0.1 | 100.0 | Black Chyrsantheum Aphis. |

The compositions A to I referred to in the above table are as follows:

| | Parts |
|---|---|
| A—Crude soya bean lecithin | 20 |
| Glucamine | 1 |
| B—Crude soya bean lecithin | 20 |
| Sulfonated fish oil | 1 |
| C—Crude soya bean lecithin | 10 |
| n-butyl alcohol | 3 |
| Sulfonated fish oil | 1 |
| D—Crude soya bean lecithin | 10 |
| n-butyl alcohol | 3 |
| E—Crude soya bean lecithin | 1 |
| n-butyl alcohol | 1 |
| F—Crude soya bean lecithin | 10 |
| Ethylene glycol mono butyl ether | 3 |
| G—Crude soya bean lecithin | 20 |
| Sodium oleate | 1 |
| H—Crude soya bean lecithin | 2 |
| n-butyl alcohol | 1 |
| I—Crude soya bean lecithin | 2 |
| iso-butyl alcohol | 1 |

Similar toxicity effects have been found by using other lecithin preparations.

Lecithin preparations are compatible with other contact insecticides, such as nicotine, rotenone and pyrethrum preparations. The phosphatide decidedly enhances the toxicity of the nicotine, etc. and very efficient contact insecticides can be prepared in combining the two types of toxic products.

The phosphatide preparations described herein are useful as contact insecticides in general and are particularly effective for control of aphids and other soft bodied insects.

One of the chief advantages of my novel contact insecticides is their non-poisonous nature and harmlessness to human beings and large animals, such as mammals.

I claim:

1. A contact insecticide comprising lecithin.
2. A contact insecticide comprising soya bean lecithin.
3. A contact insecticide containing lecithin as the essential active ingredient.
4. A contact insecticide containing lecithin as the essential active ingredient and a dispersing agent.
5. A contact insecticide comprising an aqueous preparation containing lecithin as the essential active ingredient and a dispersing agent.
6. A contact insecticide comprising an aqueous preparation containing technical soya bean lecithin as the essential active ingredient and a dispersing agent.
7. A contact insecticide comprising an aqueous preparation containing technical soya bean lecithin as the essential active ingredient and butyl alcohol as a dispersing agent.
8. A contact insecticide comprising an aqueous preparation containing technical soya bean lecithin as the essential active ingredient and sulfonated fish oil as a dispersing agent.

EUCLID W. BOUSQUET.